US012759508B2

(12) United States Patent
Kim et al.

(10) Patent No.: US 12,759,508 B2
(45) Date of Patent: Oct. 13, 2026

(54) SENSOR CLEANING SYSTEM AND CONTROL METHOD

(71) Applicants: HYUNDAI MOTOR COMPANY, Seoul (KR); KIA CORPORATION, Seoul (KR)

(72) Inventors: Hun Jae Kim, Hwaseong-si (KR); Tae Hyung Kim, Hwaseong-si (KR); Ju Hong Jeon, Hwaseong-si (KR); Jin Hyeok Gong, Hwaseong-si (KR); Ki Heon Choi, Hwaseong-si (KR); Joon Woo Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 57 days.

(21) Appl. No.: 18/928,675

(22) Filed: Oct. 28, 2024

(65) Prior Publication Data

US 2025/0214541 A1 Jul. 3, 2025

(30) Foreign Application Priority Data

Jan. 3, 2024 (KR) ........................ 10-2024-0000965

(51) Int. Cl.
*B60S 1/56* (2006.01)

(52) U.S. Cl.
CPC ....................................... *B60S 1/56* (2013.01)

(58) Field of Classification Search
CPC ........................................................ B60S 1/56
See application file for complete search history.

(56) References Cited

U.S. PATENT DOCUMENTS

2018/0354468 A1* 12/2018 Krishnan .................. B60S 1/56
2023/0398962 A1 12/2023 Beaubet

FOREIGN PATENT DOCUMENTS

WO 2022069460 A1 4/2022

* cited by examiner

*Primary Examiner* — Jason Y Ko
(74) *Attorney, Agent, or Firm* — Lempia Summerfield Katz LLC

(57) ABSTRACT

A method of controlling a sensor cleaning system includes identifying whether a vehicle is in a driving assistance mode, identifying whether a sensor is contaminated, cleaning the sensor by applying power using a logic set in a cleaning device according to a driving condition of the vehicle in response to the sensor being identified as contaminated, and reidentifying whether the sensor is contaminated.

18 Claims, 4 Drawing Sheets

SENSOR CLEANING SYSTEM AND CONTROL METHOD

CROSS-REFERENCE TO RELATED APPLICATION

The present application claims priority to Korean Patent Application No. 10-2024-0000965, filed on Jan. 3, 2024, the entire contents of which are incorporated herein for all purposes by this reference.

TECHNICAL FIELD

The present disclosure relates to a sensor cleaning system and a control method thereof, and more particularly to, a logic that controls a nozzle of various sensor cleaning devices used in a vehicle.

BACKGROUND

Recently, various sensors have been used to detect surroundings for advanced driver assistance systems (ADAS) of a vehicle. Sensors are mounted in a vehicle and used for driving assistance and autonomous driving of the vehicle by detecting the locations and distances of obstacles such as buildings, pedestrians, other vehicles, and the like in the surroundings.

Since these sensors play a very important role in the driving assistance of a vehicle, a foreign substance in front of the sensor may drastically reduce the accuracy of sensing and cause a fatal problem for the safety of the vehicle.

To solve such problems, sensors usually include a cleaning device for cleaning foreign substances. A conventional sensor cleaning device has a logic that allows the cleaning device to operate without considering the driving conditions of a vehicle or an outside temperature. Therefore, a problem lies in that foreign substances are not completely removed depending on the driving conditions or the outside temperature.

The description above explained as a background technology is only to improve understanding of the background of the present disclosure, and should not be acknowledged as the prior art already known to those having ordinary skill in the art.

SUMMARY

An embodiment of the present disclosure is related to a sensor cleaning system considering the driving conditions and the outside temperature of a vehicle and to a controlling method thereof.

According to an embodiment of the present disclosure, a sensor cleaning system control method includes: determining that the vehicle is in a driving assistance mode; determining a contamination state of a sensor; applying power to a cleaning device according to a logic set according to a driving condition of the vehicle and the contamination state; and re-determining the contamination state of the sensor.

Re-determining the contamination state may include, in response to the sensor being determined as contaminated, switching the driving assistance mode to a driver control mode.

Applying power to the cleaning device according to the logic may include applying power to the cleaning device according to a first logic when an outside temperature is lower than a preset temperature.

The first logic may include at least one repetition of a process where the power is applied to the cleaning device for a first time (i.e., a first period of time), the power is cut off for the first time, the power is applied again for the first time, and the power is cut off for a second time (i.e., a second period of time).

The first time may be between 0.5 seconds and 0.9 seconds, and the second time may be between 5 seconds and 8 seconds.

Applying power to the cleaning device according to the logic may include applying power according to a first logic when an outside temperature is a preset temperature or higher and a speed of the vehicle is a preset speed or higher.

Applying power to the cleaning device according to the logic may include applying power according to a second logic when an outside temperature is a preset temperature or higher and a speed of the vehicle is lower than a preset speed.

The second logic may include at least one repetition of a process where the power is applied to the cleaning device for a third time (i.e., a third period of time), the power is cut off for the third time, the power is applied again for the third time, the power is cut off again for the third time, the power is applied again for the third time, and the power is cut off for a fourth time (i.e., a fourth period of time).

The third time may be between 0.1 seconds and 0.5 seconds, and the fourth time may be between 5 seconds and 8 seconds.

According to an embodiment of the present disclosure, a sensor cleaning system includes: a driving mode determining unit configured to determine whether the vehicle is in a driving assistance mode; a sensor configured to determine whether a front portion of the sensor is contaminated; a cleaning device inclined at a predetermined angle on an upper part of the sensor to spray fluid to the front portion of the sensor; and a control unit. The control unit is configured to control a cleaning process for the sensor by applying power to the cleaning device according to a logic set based on a driving condition of the vehicle in response to the front portion of the sensor being determined as contaminated. The sensor is further configured to re-determine whether the front portion of the sensor is contaminated after the cleaning process.

The control unit may request to switch the driving assistance mode to a driver control mode in response to the front portion of the sensor being re-determined as contaminated.

The logic may be set in the cleaning device and may include a first logic. The control unit may perform (i.e., control) the cleaning process for the sensor using the first logic when an outside temperature is lower than a preset temperature.

In the system, the first logic may include at least one repetition of a process where the power is applied to the cleaning device for a first time (i.e., a first period of time), the power is cut off for the first time, the power is applied again for the first time, and the power is cut off for a second time (i.e., a second period of time).

In the system, the first time may be between 0.5 seconds and 0.9 seconds, and the second time may be between 5 seconds and 8 seconds.

The logic may be set in the cleaning device and may include a first logic. The control unit may perform (i.e., control) the cleaning process for the sensor using the first logic when an outside temperature is a preset temperature or higher, and a speed of the vehicle is a preset speed or higher.

The logic may be set in the cleaning device and may include a first logic. The control unit may perform the cleaning process for the sensor using the second logic among logics set in the cleaning device when an outside temperature is a preset temperature or higher, and a speed of the vehicle is lower than a preset speed.

The second logic may be includes at least one repetition of a process where the power is applied to the cleaning device for a third time (i.e., a third period of time), the power is cut off for the third time, the power is applied again for the third time, the power is cut off again for the third time, the power is applied again for the third time, and the power is cut off for a fourth time (i.e., a fourth period of time).

The third time may be between 0.1 seconds and 0.5 seconds, and the fourth time may be between 5 seconds and 8 seconds.

The present disclosure may secure an optimal sensor cleaning performance using a logic according to driving conditions and external environmental conditions.

In addition, a highly effective cleaning may be achieved by controlling the spray timing when a cleaning device cleans the front part of a sensor even if the spraying angle of the cleaning device nozzle located on the top of the sensor is small.

Also, it is possible to achieve the effect of reducing the amount of fluid sprayed compared to the conventional cleaning methods.

The effects obtained from the present disclosure are not limited to the effects described above, and other effects not mentioned should be more clearly understood by those having ordinary skill in the art from the description below.

DETAILED DESCRIPTION

Figure 1:
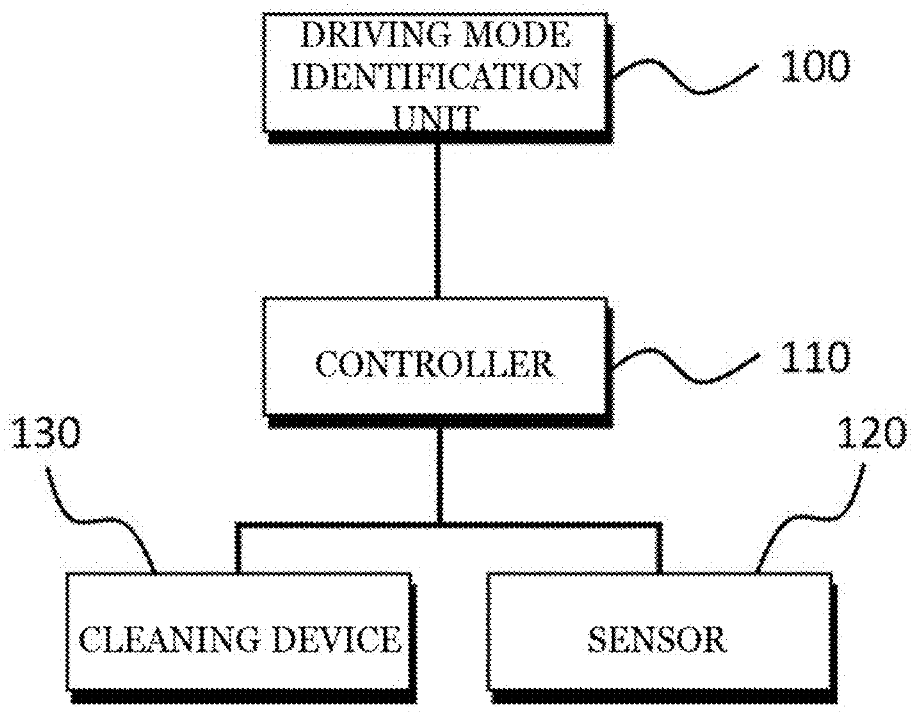
FIG. 1 is a view illustrating a sensor cleaning system according to an embodiment of the present disclosure.

While embodiments are described with reference to the accompanying drawings, it should be understood that various changes and modifications may be made in the disclosure. Further, it should be understood that the disclosure is not limited to the specific embodiments thereof, and various changes, equivalences, and substitutions may be made without departing from the scope and spirit of the disclosure.

Terms containing ordinal numbers, such as "first", "second", and the like, may be used to describe various components. However, the components are not limited by the terms. These terms may be used only in a nominal sense to differentiate one component from another component.

The term "and/or" is used to include all instances of any combination of multiple items being the subject. For example, "A and/or B" includes all three cases: "A", "B", and "A and B".

When a component is used to be "coupled" or "connected" to another component, it should be understood that the component may be either connected directly to another component or connected indirectly via another medium.

Furthermore, "directly coupled/directly coupled" refers to one component directly coupling another component without an intermediate component.

It should also be understood that when a layer (film), a region, a pattern, or a structure is referred to as being "on" another layer (film), region, pad, or pattern, it may be directly on the other layer or intervening layers may also be present. Further, it should be understood that when a layer is referred to as being "on/under" or "under/on", it may be shown in the drawings for convenience, and is only used to indicate the relative positional relationship between components. It should not be understood to limit the positions of actual components. For example, "B on A" simply indicates that B is shown above A in the drawing, unless otherwise stated or in the case where A should be placed above B due to the nature of A or B. In actual products and the like, B may be located under A, or B and A may be placed side to side.

In addition, the thickness or size of each layer (film), region, pattern or structure in the drawings may be changed for clarity and convenience of explanation. They may not entirely reflect the actual size.

The terms in the present disclosure are used to describe an embodiment and are not intended to restrict and/or limit the present disclosure. Singular forms are intended to include plural forms unless the context clearly indicates otherwise. According to an embodiment of the present disclosure, terms such as "comprise," "include," or "consist of" are used to designate presence of characteristics, numbers, steps, operations, elements, components, or a combination thereof. Such terms do not foreclose the presence or possibility of addition of one or more other characteristics, numbers, steps, operations, elements, components, or a combination thereof.

When a component, unit, controller, device, element, apparatus, or the like of the present disclosure is described as having a purpose or performing an operation, function, or the like, the component, unit, controller, device, element, apparatus, or the like should be considered herein as being "configured to" meet that purpose or to perform that operation or function. Each component, unit, controller, device, element, apparatus, and the like may separately embody or be included with a processor and a memory, such as a non-transitory computer readable media, as part of the apparatus or a system.

Unless otherwise defined, all terms used in describing embodiments of the present disclosure, including technical or scientific terms, have the same meaning as generally understood by a person having ordinary skill in the technical field to which the present disclosure pertains. Terms defined in commonly used dictionaries should be interpreted as having a meaning consistent with the meaning in the context of the related technology, and unless clearly defined in this application, should not be interpreted in an ideal or excessively formal sense.

An embodiment of the present disclosure is described in detail with reference to the attached drawings. However, identical or corresponding components have been assigned the same reference numbers regardless of the reference numerals, and a redundant description thereof has been omitted.

A sensor cleaning system according to an embodiment of the present disclosure may include a driving mode identification unit 100, a control unit 110, and a sensor 120.

Referring to FIG. 1, the driving mode identification unit 100 may be a device that identifies whether a vehicle is autonomous. The driving mode identification unit 100 may request, receive, and identify data on whether the vehicle is driving autonomously from the autonomous driving control unit 110. For another embodiment, the driving mode identification unit 100 may identify whether the vehicle is driving autonomously through at least one of whether the sensor 120 operates, whether the steering wheel is gripped, or whether an accelerator pedal or a brake is activated.

The sensor 120 may identify whether the surface of a sensor cover 170 of the sensor 120 is contaminated while scanning the surroundings of the vehicle for autonomous driving.

When noises severely occur in the process of scanning the surroundings of the vehicle through the sensor 120, the sensor 120 may recognize that the sensor cover 170 is contaminated.

When cleaning of the front of the sensor is completed through a cleaning device 130, the sensor 120 may reidentify the contamination status in the same manner as above.

The cleaning device 130 may spray fluid to the sensor 120 to clean the surface of the sensor cover 170 of the sensor 120. Although not specifically shown, the cleaning device 130 may include a washer tank, a washer pump, and a sensor nozzle. The sensor 120 may include a plurality of the sensors in the front of a vehicle. In this case, the cleaning device 130 may include a plurality of ride nozzles and a plurality of washer pumps.

When the surface of the sensor cover 170 is identified to be contaminated through the sensor 120, the control unit 110 may control to clean the sensor 120 by applying power to a logic set in the cleaning device 130 according to the driving conditions of the vehicle.

Figure 2:
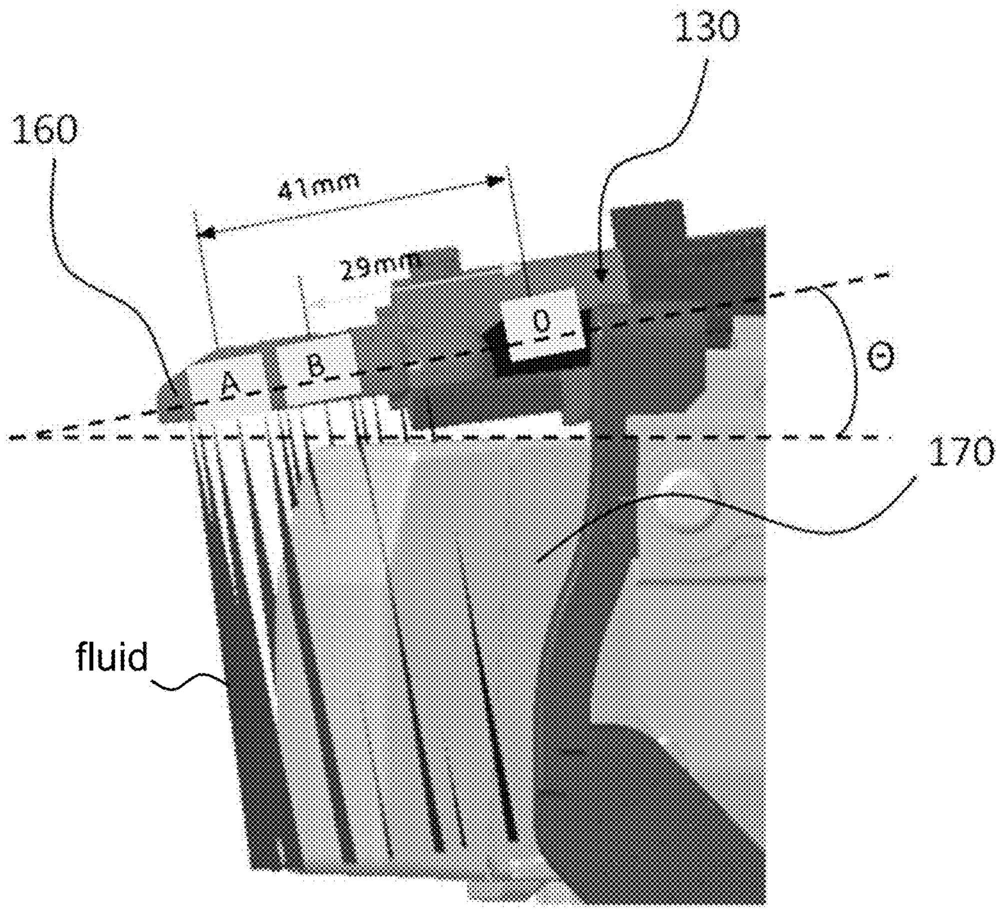
FIG. 2 is a view illustrating that a sensor nozzle protrudes to clean a sensor cover in a sensor cleaning system according to an embodiment of the present disclosure.

FIG. 2 is a view illustrating that a nozzle unit 160 protrudes in the sensor cleaning system to clean the sensor cover 170 according to an embodiment of the present disclosure.

The nozzle unit 160 may protrude from its original position to the end, and the length of the nozzle unit may be a stroke.

According to an embodiment, the maximum length of the stroke of the nozzle unit 160 may be 41 mm and the medium length of the stroke may be 29 mm. The stroke may not be placed horizontally on the upper part of the sensor 160, but may move down by the angle of Θ. The angle of Θ may be 7.8°.

Therefore, the fluid vertically discharged from the nozzle unit may be sprayed on the entire surface of the sensor cover 170 according to the positions at which the nozzle advances.

Referring to FIG. 3, when the nozzle unit 160 protrudes to point "A", which is the maximum stroke, the nozzle unit 160 may spray the fluid to the lower part of the sensor cover 170. When the nozzle unit 160 protrudes to point "B", the nozzle unit 160 may spray the fluid to the upper part of the sensor cover 170. Through this, the nozzle unit 160 may clean the upper and lower parts of the sensor cover 170 while moving between points "O" and "A".

However, a piston 220 may not move forward and backward through a separate actuator but may move forward by overpowering the elastic force of a spring 270 through the pressure of the fluid through a washer pump 150. Since the nozzle is positioned at point "B" for a very short time, it is difficult to clean the upper part of the sensor cover 170.

According to an embodiment, the washer pump 150 may be controlled through a logic by adjusting the time to which power is applied to the washer pump 150 of the nozzle unit 160 and by placing a nozzle to clean the upper part of the sensor cover 170.

When the outside temperature is room temperature (about 20° C.) and the pressure of the washer pump 150 is 4.5 bar, since the compression force (restoring force) of the spring 270 that returns the piston 220 and the force that advances the piston 220 by the pressure of the washer pump 150 generated by applying power is balanced out, it may take about 0.3 seconds for the nozzle unit 160 to reach point "A" from point "S".

When the outside temperature is low-temperature (about −15° C.) and the pressure of the washer pump 150 is 4.5 bar, since the compression force (restoring force) of the spring 270 that returns the piston 220 and the force that advances the piston 220 by the pressure of the washer pump 150 generated by applying power is balanced out, it may take about 0.7 seconds to reach point "A" from point "S".

When the vehicle is at a high speed of (80 kph) or higher, although the nozzle advances to the point "A", the driving wind may increase. Therefore, the fluid may not be sprayed from the nozzle in a straight line. However, the streamline of the fluid may be changed to clean the sensor cover 170.

When the outside temperature is low or the speed of the vehicle is 80 kph or higher, the sensor cover 170 may be cleaned through a first logic whereby the nozzle reaches from point "S" to point "A" in 0.7 seconds. When the outside temperature is room temperature, a front protective glass may be cleaned through a second logic whereby the nozzle reaches from point "S" to point "A" in 0.3 seconds.

Figure 3A:
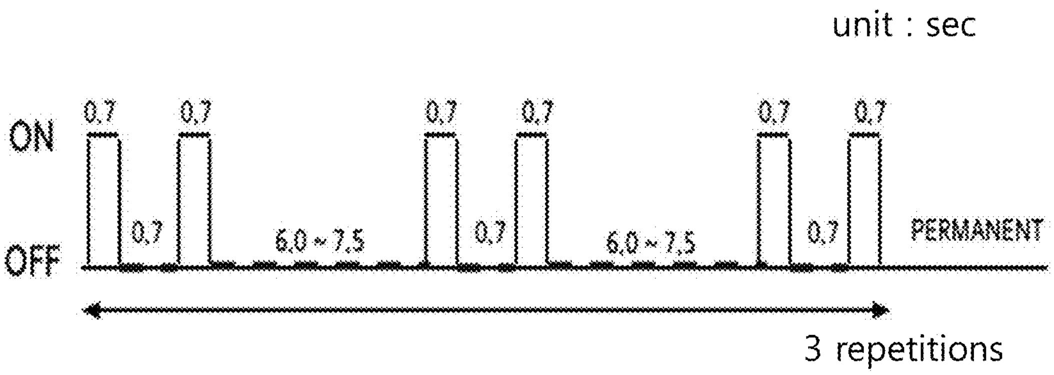
FIGS. 3A and 3B are views illustrating a first logic and a second logic to apply power to a washer pump in a sensor cleaning system according to an embodiment of the present disclosure.

Referring to FIG. 3A, in the first logic, power may be applied for 0.7 seconds, cut off for 0.7 seconds, and applied again for 0.7 seconds. In this manner, the fluid may be sprayed by applying pressure to the piston 220, and after 6 to 7.5 seconds, the power supply may spray the fluid again. In the first logic, the above process may be repeated three times.

Figure 3B:
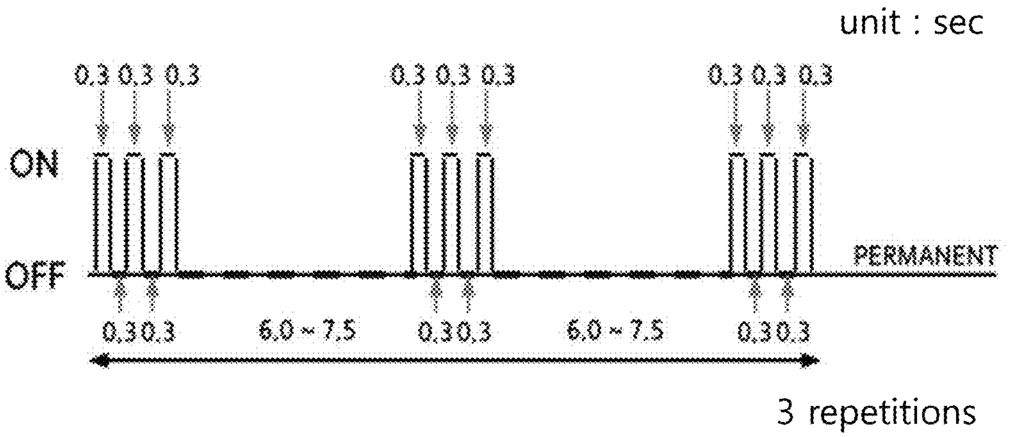

Referring to FIG. 3B, in the second logic, power may be applied for 0.3 seconds, cut off for 0.3 seconds, applied again for 0.3 seconds, cut off for 0.3 seconds, and applied again for 0.3 seconds. In this manner, the fluid may be sprayed by applying pressure to the piston 220 to spray the fluid, and after 6 to 7.5 seconds, the power supply may spray the fluid again. In the second logic, the above process may be repeated three times.

The control unit 110, when the sensor 120 identifies whether the front of the sensor 120 is contaminated after the cleaning of the sensor cover 170 through the cleaning device 130 is completed, may request a driver control condition change. The driver control condition may be a manual control request. A notification may be displayed to the driver through the cluster of the vehicle and delivered to the driver through voice.

Figure 4:
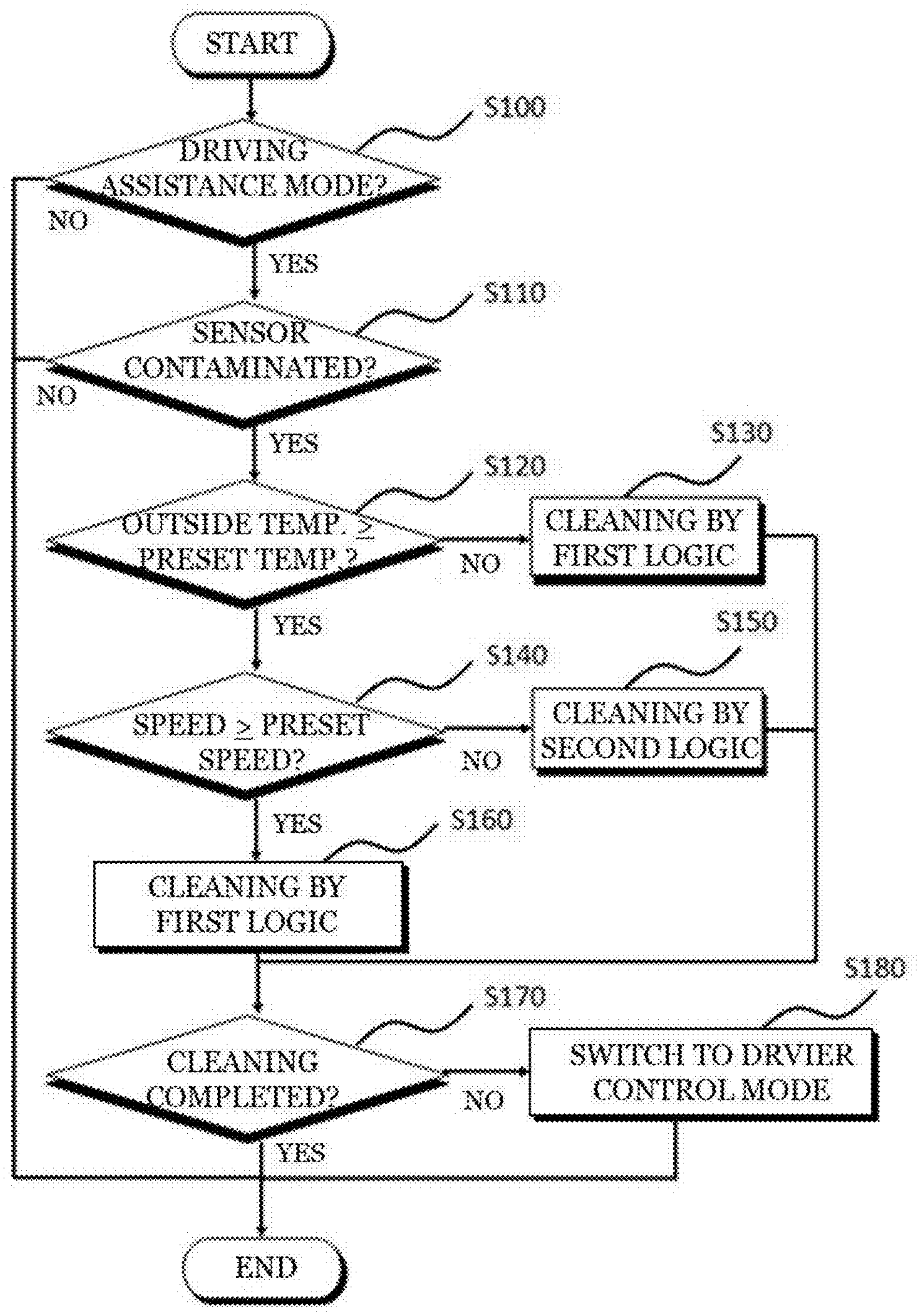
FIG. 4 is a flowchart of a sensor cleaning system control method according to an embodiment of the present disclosure.

Referring to FIG. 4, a control method of a sensor cleaning system is described.

The method may include identifying whether a vehicle is autonomous at step S100. It has been described how to identify whether the vehicle is autonomous, and thus the detailed description thereof has been omitted.

The method may include, when it is determined that the vehicle is autonomous, identifying whether the sensor cover 170 of the sensor 120 is contaminated at step S110.

The method may include, when it is determined that the sensor cover 170 of the sensor 120 is contaminated, identifying whether the outside temperature is a preset temperature or higher at step S120. The preset temperature may be 4° C.

The method may include, when it is determined that the outside temperature is not 4° C. or higher, applying power using the first logic and cleaning the sensor cover 170 of the sensor 120 at step S130. The first logic is described in detail above, and thus the detailed description thereof has been omitted.

The method may include, when it is determined that the outside temperature is 4° C. or higher, identifying whether the speed of the vehicle is a preset speed or higher at step S140. The preset speed may be 80 kph.

The method may include, when it is determined that the outside temperature is 4° C. or higher, and the speed of the vehicle is lower than 80 kph, applying power using the second logic, and cleaning the sensor cover 170 of the sensor 120 at step S150. The second logic is described in detail above, and thus the detailed description thereof has been omitted.

The method may include, when it is determined that the outside temperature is 4° C. or higher, and the speed of the vehicle is 80 kph or higher, applying power using the first logic, and cleaning the sensor cover 170 of the sensor 120 at step S160. The first logic is described in detail, and thus the detailed description thereof has been omitted.

The method may include, when the cleaning is completed, identifying whether the sensor cover 170 of the sensor 120 is contaminated at step S170.

The method may include, when it is determined that the sensor cover 170 of the sensor 120 is contaminated, requesting a driver control condition change and informing the request to the driver at step S180.

Although the above description focuses on example embodiments, these are only example and do not limit the present disclosure. Those having ordinary skill in the art should understand that various variations and modified applications are possible without departing from the substantial characteristics of an embodiment of the present disclosure. For example, in embodiments, each component may be modified and implemented. The variations and differences in application should be construed as being included in the scope of the present disclosure as defined in the appended claims.

DESCRIPTION OF REFERENCE NUMBERS IN DRAWINGS

100 Driving Mode Identification Unit
110 Control Unit
120 Sensor
130 Cleaning Device
140 Washer Tank
150 Washer Pump
160 Nozzle Unit
170 Sensor Cover

What is claimed is:

1. A method of controlling a sensor cleaning system of a vehicle, the method comprising:
- determining, by a driving mode determining unit, that the vehicle is in a driving assistance mode;
- determining, by a sensor, a contamination state of a front portion of the sensor;
- controlling, by a control unit, a cleaning process for the sensor by applying power to a cleaning device according to a logic set according to a driving condition of the vehicle in response to the front portion of the sensor being determined as contaminated, wherein the cleaning device is inclined at a predetermined angle on an upper part of the sensor to spray fluid to the front portion of the sensor; and
- re-determining, by the sensor, the contamination state of the front portion of the sensor.

2. The method of claim 1, wherein re-determining the contamination state comprises, in response to the sensor being determined as contaminated, switching the driving assistance mode to a driver control mode.

3. The method of claim 1, wherein applying the power to the cleaning device according to the logic includes applying the power to the cleaning device according to a first logic when an outside temperature is lower than a preset temperature.

4. The method of claim 3, wherein the first logic includes at least one repetition of a process where the power is applied to the cleaning device for a first period of time, the power is cut off for the first period of time, the power is applied again for the first period of time, and the power is cut off for a second period of time.

5. The method of claim 4, wherein the first period of time is between 0.5 seconds and 0.9 seconds, and the second period of time is between 5 seconds and 8 seconds.

6. The method of claim 1, wherein applying the power to the cleaning device according to the logic includes applying the power according to a first logic when an outside temperature is a preset temperature or higher and a speed of the vehicle is a preset speed or higher.

7. The method of claim 1, wherein applying the power to the cleaning device according to the logic includes applying the power according to a second logic when an outside temperature is a preset temperature or higher and a speed of the vehicle is lower than a preset speed.

8. The method of claim 7, wherein the second logic includes at least one repetition of a process where the power is applied to the cleaning device for a third period of time, the power is cut off for the third period of time, the power is applied again for the third period of time, the power is cut off again for the third period of time, the power is applied again for the third period of time, and the power is cut off for a fourth period of time.

9. The method of claim 8, wherein the third period of time is between 0.1 seconds and 0.5 seconds, and the fourth period of time is between 5 seconds and 8 seconds.

10. A sensor cleaning system of a vehicle, the sensor cleaning system comprising:
- a driving mode determining unit configured to determine whether the vehicle is in a driving assistance mode;
- a sensor configured to determine whether a front portion of the sensor is contaminated;
- a cleaning device inclined at a predetermined angle on an upper part of the sensor to spray fluid to the front portion of the sensor; and
- a control unit configured to control a cleaning process for the sensor by applying power to the cleaning device according to a logic set according to a driving condition of the vehicle in response to the front portion of the sensor being determined as contaminated,
- wherein the sensor is further configured to re-determine whether the front portion of the sensor is contaminated after the cleaning process.

11. The sensor cleaning system of claim 10, wherein the control unit is further configured to request to switch the driving assistance mode to a driver control mode in response to the front portion of the sensor being re-determined as contaminated.

12. The sensor cleaning system of claim 10, wherein:
- the logic is set in the cleaning device and includes a first logic; and
- the control unit is configured to control the cleaning process for the sensor using the first logic when an outside temperature is lower than a preset temperature.

13. The sensor cleaning system of claim 12, wherein the first logic includes at least one repetition of a process where the power is applied to the cleaning device for a first period of time, the power is cut off for the first period of time, the power is applied again for the first period of time, and the power is cut off for a second period of time.

14. The sensor cleaning system of claim 13, wherein the first period of time is between 0.5 seconds and 0.9 seconds, and the second period of time is between 5 seconds and 8 seconds.

15. The sensor cleaning system of claim 10, wherein:

the logic is set in the cleaning device and includes a first logic; and the control unit is configured to control the cleaning process for the sensor using the first logic when an outside temperature is a preset temperature or higher, and a speed of the vehicle is a preset speed or higher.

16. The sensor cleaning system of claim 10, wherein:

the logic is set in the cleaning device and includes a second logic; and the control unit is configured to controls the cleaning process for the sensor using the second logic when an outside temperature is a preset temperature or higher, and a speed of the vehicle is lower than a preset speed.

17. The sensor cleaning system of claim 16, wherein the second logic includes at least one repetition of a process where the power is applied to the cleaning device for a third period of time, the power is cut off for the third period of time, the power is applied again for the third period of time, the power is cut off again for the third period of time, the power is applied again for the third period of time, and the power is cut off for a fourth period of time.

18. The sensor cleaning system of claim 17, wherein the third period of time is between 0.1 seconds and 0.5 seconds, and the fourth period of time is between 5 seconds and 8 seconds.

* * * * *